Nov. 30, 1948.  G. DEAKIN  2,454,781
MATCHED POTENTIAL CONTROL SYSTEM
Filed Sept. 17, 1945  3 Sheets-Sheet 1
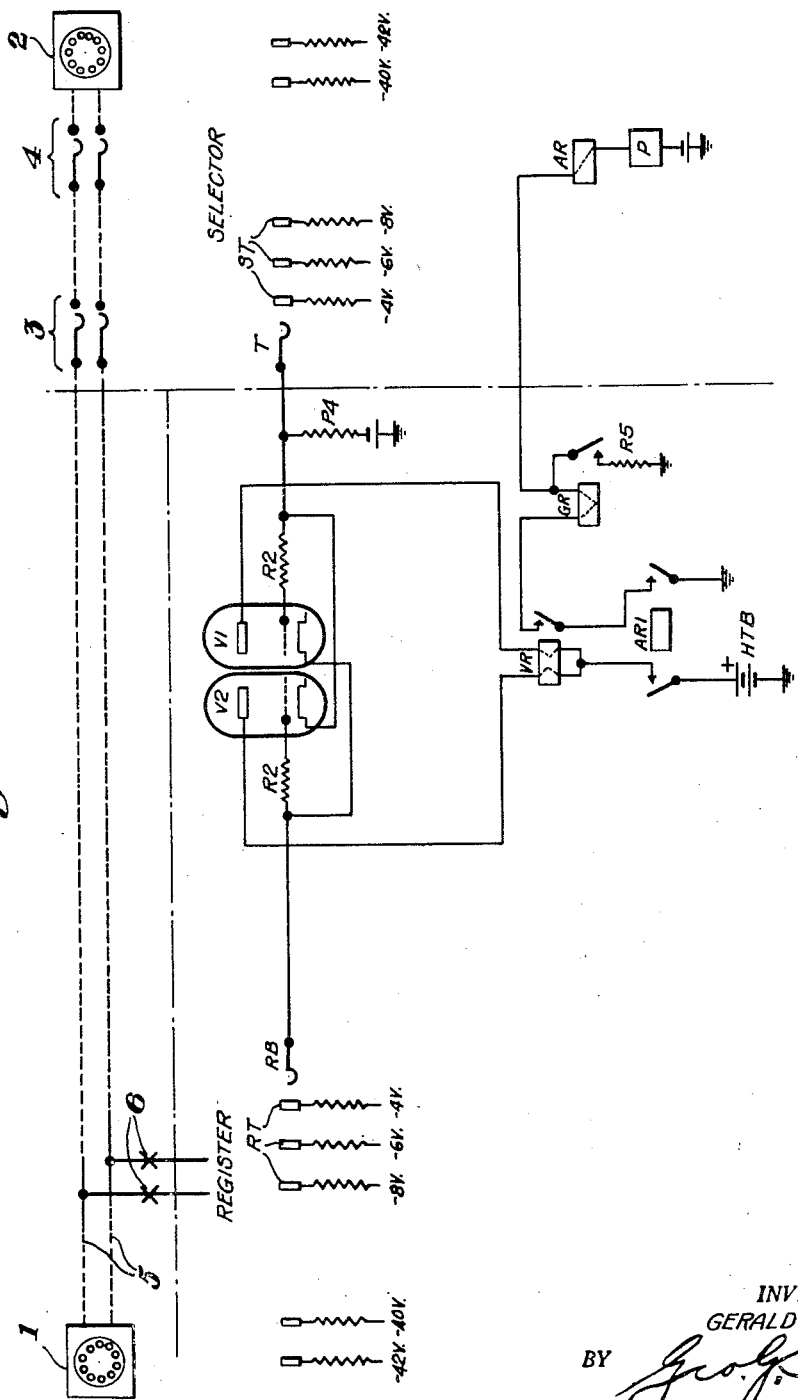
Fig. 1.
INVENTOR.
GERALD DEAKIN
BY
ATTORNEY

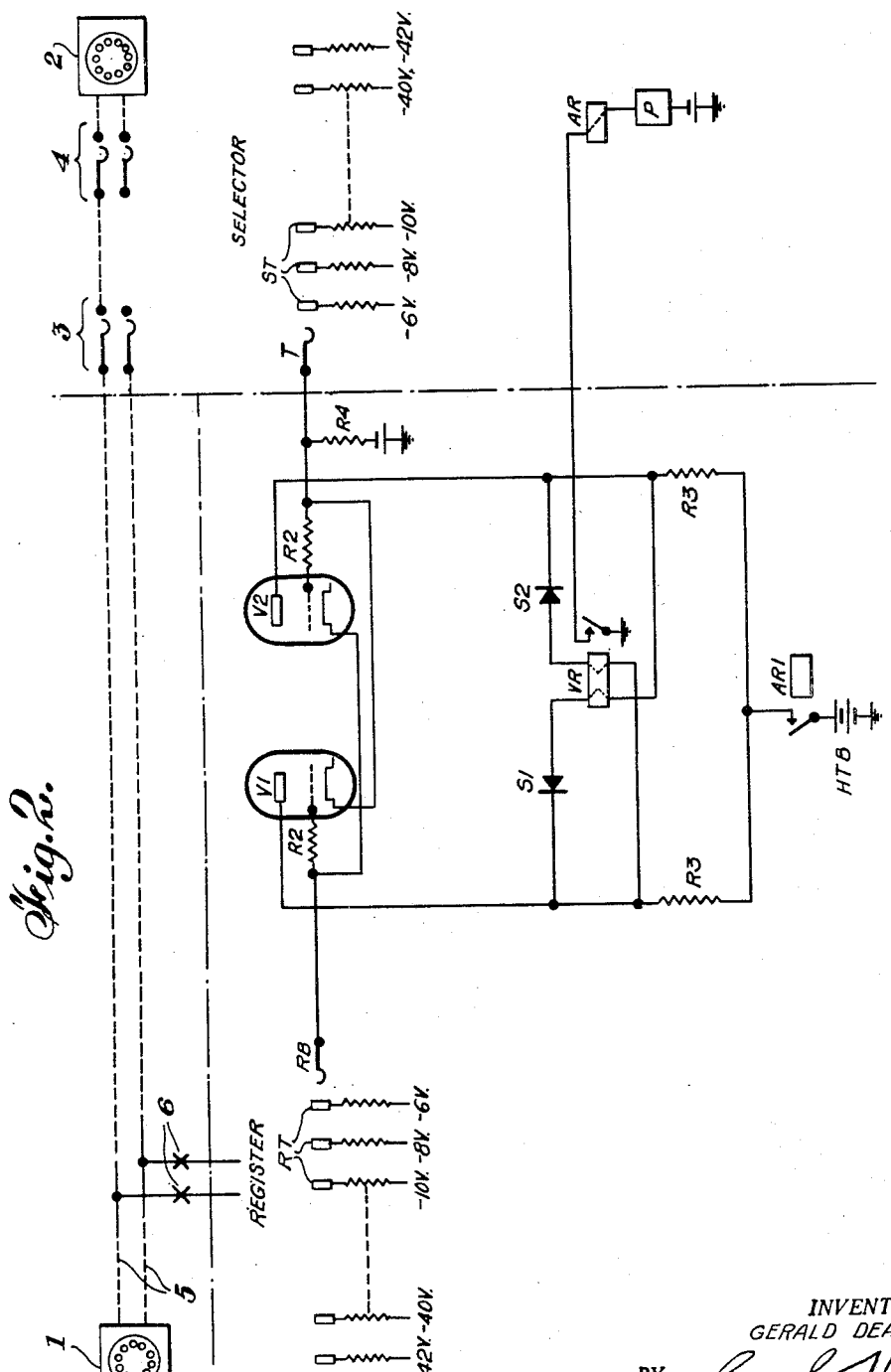

Nov. 30, 1948.    G. DEAKIN    2,454,781
MATCHED POTENTIAL CONTROL SYSTEM
Filed Sept. 17, 1945    3 Sheets-Sheet 3
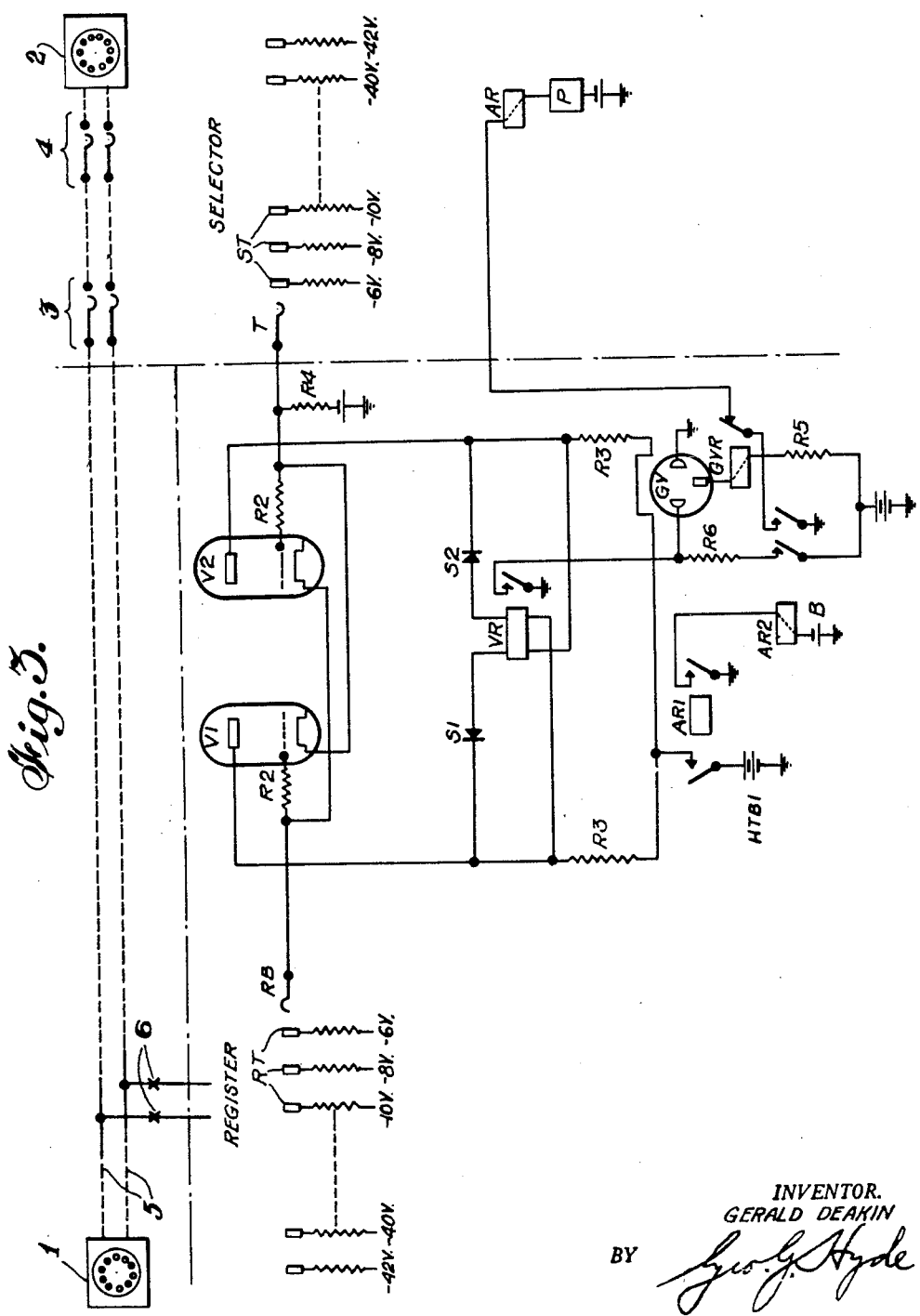
INVENTOR.
GERALD DEAKIN
BY
ATTORNEY Patented Nov. 30, 1948

2,454,781

UNITED STATES PATENT OFFICE 2,454,781

MATCHED POTENTIAL CONTROL SYSTEM

Gerald Deakin, New York, N. Y., assignor to International Standard Electric Corporation, New York, N. Y., a corporation of Delaware Application September 17, 1945, Serial No. 616,909

9 Claims. (Cl. 179—18)

This invention relates to electrical control systems in which a controlled device is actuated when a potential applied to the system at a control station is matched by a potential applied to the system at an operating station. It is particularly applicable to automatic telephone systems, but may be used in control systems and especially remote control systems of various types, such as electric elevator control, gun control, calculating machines, telegraph, ticket and other automatic printers and the like.

The invention is applicable to a control system which includes two triodes to which potentials from the stations are applied, the operation of the triodes being determined by the relationship between the applied potentials. An arrangement is provided in which only one triode at a time will pass current, and then only when the potential difference is greater than a predetermined value, the control grid of the other triode being at a cut-off potential. The particular triode which is placed in operation is determined by the relative polarity of the applied potentials. The control system is arranged to operate the controlled device only when current is passed by both triodes or by neither one, which occurs when the potential difference is less than said value, a potential relationship referred to herein as matching.

The invention includes the use of an actuating device whose operation is regulated by the relative value of the currents from the two tubes, arranged so that the device is placed in one control position or condition whenever the difference between the currents is greater than a predetermined value, and in a second control position or condition when the difference falls below that value and the effect of the currents is substantially balanced. In the disclosed system the controlled device is arranged for actuation when the actuating device is in the second position. The indicated type of operation is conveniently provided by a differential relay.

It has been found that under certain conditions and with certain types of actuating devices, and particularly certain differential relays, the latter may become momentarily deenergized when the relative polarity of the applied potentials changes, producing false operation; and a purpose of the invention is the provision of means for preventing effective deenergizing of the actuating device merely by a polarity change between the applied potentials.

The present invention includes improvements on the control circuits disclosed in the copending application of Gerald Deakin, Serial No. 484,184, filed April 23, 1943, now Patent No. 2,380,950, dated August 7, 1945.

Other features and advantages of the invention will appear from the following description considered in connection with the accompanying drawings, in which Fig. 1 is a diagram of one embodiment of the invention, including only as much of the control system as is necessary for a clear understanding of the invention;

Fig. 2 is a similar diagram incorporating another arrangement for preventing action during polarity changes; and Fig. 3 is similar to Fig. 2, showing a control system including a gas tube.

The drawings illustrate the application of the invention to an automatic telephone system in which calling and called subscribers' stations 1 and 2 may be interconnected by means including a plurality of selector switches 3 and 4. The numerical operations of the selectors are controlled by the calling subscriber's customary impulse sender, key sender or other common form of control device through the agency of a register provided at the central exchange. The calling station 1 is connected to the brushes of selector switch 3 by known switches (not shown) and a connecting circuit 5, and the register is attached to the connecting circuit 5 through switching means 6.

The selector switches are of the customary type, having a bank of terminals with which a set of brushes cooperates. In the drawings three brushes are shown for selector switch 3, the lowermost being designated as T, although the selector may have a larger number of brushes. The selector brushes are moved over the selector terminals, including test terminals ST engaged by brush T, while a clutch magnet P is energized, and are stopped on a set of terminals when this magnet becomes deenergized, this construction and operation being well known.

The register comprises a series of switches successively operable by the calling device in accordance with successive digits of the called number which are dialed by the calling subscriber. Brush RB and a set of terminals RT of one of these register switches are illustrated. This is the register switch which responds to the digit in accordance with which the illustrated selector switch 3 is to be set.

The actuating device includes a differential relay VR and a pair of triodes V1 and V2, of similar construction; the control grids and cathodes of said triodes being cross-connected, and also interposed between the selector brushes T and the register brushes RB, so that the said grids respond instantly to the changing potential conditions of said selector and register units; the potential of the grid of triode VI being always at a pre-set relationship to that of the energized selector brush and the potential of the grid of triode V2 being always at a pre-set relationship to that of the energized register brush. Each of the respective differential windings of relay VR is connected at its free end to the anode of one of the triodes VI and V2, the two windings being joined at the other end and connected through the left armature and its associated front contact of register relay ARI to grounded high tension battery HTB. The selector brush drive controlling magnet P is connected in a circuit from grounded battery through selector relay AR, the winding of grounding relay GR, the armature and front contact of relay VR, and the right armature and front contact of relay ARI to ground. The armature of relay GR is connected to the circuit and its front contact is connected through a resistor R5 to ground.

With this arrangement relay VR will be energized whenever either triode is passing substantially more anode current than the other triode, as in the ordinary condition where one triode is cut out while the other is in operation, relay VR being energized regardless of the triode that generates anode current. Under these circumtsances the magnet P will be energized and the selector brush T will continue to hunt until it contacts a terminal whose potential matches that of the register terminal RT engaged by brush RB. When this occurs both triodes will pass anode current of substantially equal value, the fields of the two windings of differential relay VR will cancel each other and the armature will shift to back position, deenergizing relay GR, whose armature will break the connection with ground through resistor R5, and also deenergizing magnet P, halting selector brush T on the matching terminal.

However, when the relative polarity of the brushes shifts without matching the brush potentials, and current is cut off from one winding of relay VR while current starts to flow in the other winding, it is desirable to provide means for preventing the release of the armature by the decaying field before it is picked up by the increasing field, or at least to prevent any momentary armature release from affecting the actuated device, in this instance clutch magnet P. This may be accomplished by introducing grounding relay GR, the field of which will remain at full strength until the armature of relay VR breaks its front contact; and the armature of relay GR will remain in front position after such a circuit break at relay VR until the field of relay GR has decayed to a substantial extent. By proper selection of the relays any period during which the circuit through the armature of relay VR may be thus broken will be so brief that the field of relay GR does not decay to a point where its armature is released. The arrangement therefore provides a safety factor guarding against false operation of relay VR during polarity changes.

Another arrangement for providing a similar safety factor is illustrated in Fig. 2. In this embodiment the circuits from the anodes pass through blocking rectifiers SI and S2 and the windings of differential relay VR, then each is connected to the circuit from the other anode, thence through a resistor R3 and the front contact and armature of register relay ARI to grounded high tension battery HTB. With this arrangement, when the relative polarity of the applied potentials changes and cuts off the current through one of the windings of relay VR, a closed circuit through said winding, the resistors R3 and a rectifier SI or S2 is provided, through which the current generated by the decay of the magnetic field of this winding will continue to flow in the same direction for a brief period. This will increase the rate of decay of the field, particularly when an appropriately high value is selected for the resistors R3. The rate of increase of the magnetic field of the other winding will likewise be increased, since additional resistance is introduced in series with the other winding, and the circuit includes not only one resistor R3 but also the impedance of the triode. Moreover, current through this circuit is provided by the high tension battery HTB.

The net result of speeding up both the rate of decay of one magnetic field of relay VR and the rate of increase of the other field is to reduce appreciably the time during which these fields neutralize each other or are so close to the neutralizing value that the armature of the relay might be released. The tendency toward such release will therefore be minimized, and by proper selection of the circuit elements will have no appreciable effect on the continued operation of the clutch magnet P.

The embodiment illustrated in Fig. 3 employs the features disclosed in Fig. 2, but utilizes a potential operated device, and specifically a gas tube GV, in the circuit between the armature of relay VR and the magnet P, together with a somewhat different relay arrangement in which the circuit of magnet P is closed by the operation of the register relay system, and is opened by energizing the gas tube, which occurs when differential relay VR is deenergized.

In the specific arrangement shown, the front contact of relay VR is connected to an auxiliary or igniting electrode of gas tube GV and through resistor R6 and the front armature and associated front contact of relay AR2 to grounded high tension battery HTB. One of the operating electrodes of the gas tube GV is grounded and the other is connected through the winding of the gas tube relay GVR and resistor R5 to battery HTB. The clutch magnet P and relay AR are connected through the armature and back contact of relay GVR and the back armature and associated front contact of relay AR2 to ground. The winding of relay AR2 is connected from grounded battery B through the right armature and associated front contact of relay ARI to ground.

In this embodiment, when register relay ARI is energized the anode circuits of triodes VI and V2 are closed and current flows through one circuit, energizing relay VR, unless the grid potentials are matched. Relay AR2 is also energized, closing the circuit from battery HTB through resistor R6 and the armature of relay VR to ground; and the potential on the auxiliary electrode of tube GV will be below the firing point due to the completion of the latter circuit, which also connects said electrode to ground. At the same time the circuit through selector drive clutch magnet P will be closed by relay AR2 and the selector brushes will be driven over the terminals.

When the potentials of brushes RB and T are matched, differential relay VR will be deenergized, breaking the ground connection of the auxiliary electrode of tube GV and raising the potential of said electrode from battery HTB to the firing point. When the latter tube fires, relay GVR will be energized, opening the circuit of clutch magnet P and halting the selector brush T on the matching terminal ST.

It will be understood that the invention has been illustrated without complicating it by the inclusion of other parts of the automatic telephone system in which it may be used, an embodiment of which is illustrated in the abovementioned Deakin application. Certain features which might be added to adapt the illustrated arrangement to particular uses, to produce particular types of operation or to adapt the circuit to tubes having different characteristics have likewise been omitted, since the use of such features under appropriate conditions will be apparent to those skilled in the art.

Moreover, while the illustrated embodiment is especially adapted for use in automatic telephone systems, and in particular the relay system actuated by the anode currents of the tubes is of a type adapted for use in such systems, it will be apparent that other types of controlled devices may be actuated by the anode currents. Likewise, different arrangements for selecting and applying the potentials to the two sides of the actuating system may be employed, though the disclosed arrangement has particular advantages when used with automatic telephone systems including a selector and register, or corresponding arrangements.

It will be understood that while the described embodiments of the invention are advantageously arranged so that current will be passed by both triodes when the potentials from the register and the selector are matched, the system will be operative if the matched potentials are effective to block both tubes, so that no anode current flows in either tube.

References herein to a triode are intended to include any electron discharge device, such as the type usually embodied in vacuum tubes, in which a stream of electrons flowing from cathode to anode is regulated by a control grid, and in particular include tetrodes and pentodes. The two triodes may be separate tubes or may be in the form of a twin tube in which both triodes are enclosed in a single envelope; but in the latter case the control grid and cathode of each triode must be separate from the control grid and cathode of the other triode except for external circuit connections.

What is claimed is:

1. An electrical control system comprising two triodes, and actuating means including two opposed elements each responsive to current from a different one of the triodes and operative when the two opposed elements are in balance, and means for initially inhibiting the operation of the actuating means for a limited period longer than transient undesired balancing of said element during operation, whereby false operation of the actuating means is prevented.

2. An electrical control system comprising two triodes each having a cathode, a control grid and an anode, and actuating means including a differential relay having two opposed windings each connected in the anode circuit of a different one of the triodes, arranged to release when the applied potentials are matched and the anode currents are substantially the same, and means for initially inhibiting the operation of the actuating means for a limited period longer than transient undesired matching of said potentials during operation, whereby false operation of the actuating means is prevented.

3. A system as set forth in claim 2 including an armature and front contact of the differential relay, in which the inhibiting means comprises a holding relay having a winding in series with said armature and contact, the holding relay remaining in operation during momentary breaks between the differential relay armature and front contact due to reversal of the relative magnetic field strengths of the differential relay windings.

4. A system as set forth in claim 2 comprising a gas tube and means for actuating the gas tube when the differential relay is released, including an armature and front contact of said relay, an igniting electrode in the gas tube, a circuit connecting said electrode to a source of firing potential and to said relay contact, and a ground connection to said armature, arranged to maintain the electrode below firing potential while the differential relay is operative and to apply firing potential to the electrode when the relay is released, said inhibiting means preventing the release of said relay during transient undesired matching of said potentials.

5. In a telecommunication system, a selector switch comprising a plurality of terminals at different potentials, a brush and means for moving the brush over the terminals; a register switch comprising a plurality of terminals at different potentials and an associated brush; and means for arresting the selector brush when the brushes have a predetermined potential relationship, comprising two triodes each having a cathode, a control grid and an anode, a connection between each control grid and a different brush, and actuating means including a differential relay having two opposed windings each connected in the anode circuit of one of the triodes, arranged to release when the potentials applied to the control grids through said connections are matched and the anode currents are substantially the same, and means for initially inhibiting the operation of the actuating means for a limited period longer than transient undesired matching of said potentials during operation, whereby false operation of the actuating means is prevented.

6. An electrical control system comprising two triodes each having a cathode, a control grid and an anode, and an actuating device including a differential relay having two opposed windings each connected in the anode circuit of a different one of the triodes, arranged to release when the applied potentials are matched and the anode currents are substantially the same, and connections between the ends of each winding forming a closed circuit, including a resistance in series with each winding.

7. A system as set forth in claim 6 in which the said connections include a separate circuit through each winding interconnecting the anode circuits, and a blocking rectifier in each of said separate circuits.

8. An electrical control system comprising two triodes each having a cathode, a control grid, and an anode, and an actuating device including a differential relay having two opposed windings, two circuits each extending from a different anode to a junction connected to a source of high tension potential and each including a resistor, a separate circuit through each winding connecting the anode circuits between the resistors and the anodes, and a blocking rectifier in each separate circuit, said separate circuits, resistors and portions of the anode circuits forming a closed circuit for each of the windings arranged to provide a resistive path for current induced in the winding by the collapse of the magnetic field of said winding.

9. In a telecommunication system, a selector switch comprising a plurality of terminals at different potentials, a brush and means for moving the brush over the terminals; a register switch comprising a plurality of terminals at different potentials and an associated brush; and means for arresting the selector brush when the brushes have a predetermined potential relationship, comprising two triodes, and actuating means including a differential relay having two opposed windings each connected in the anode circuit of a different one of the triodes, arranged to release when the anode currents are substantially the same, and means for initially inhibiting the operation of the actuating means for a limited period, whereby false operation of the actuating means is prevented.

GERALD DEAKIN.

No references cited.